Oct. 22, 1929.  E. R. WHITE  1,732,997
ATTACHMENT FOR AUTOMOBILE BRAKES
Filed April 20, 1928   3 Sheets-Sheet 2
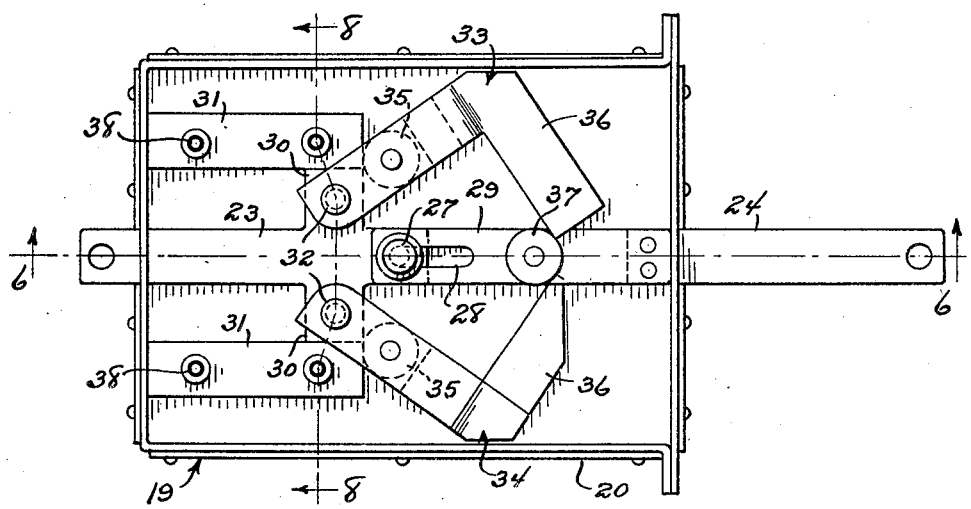
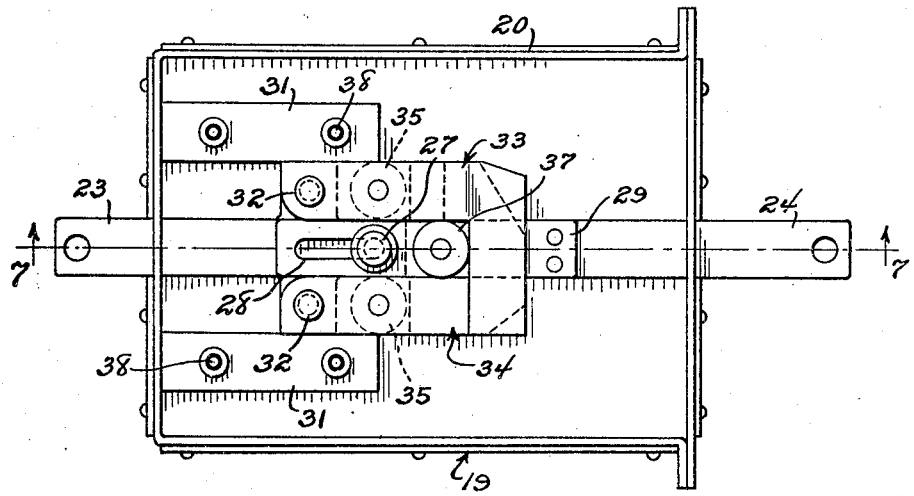
Evert Ray White
INVENTOR
BY Victor J. Evans
ATTORNEY
WITNESS: John Donovan Oct. 22, 1929. E. R. WHITE 1,732,997
ATTACHMENT FOR AUTOMOBILE BRAKES
Filed April 20, 1928 3 Sheets-Sheet 3

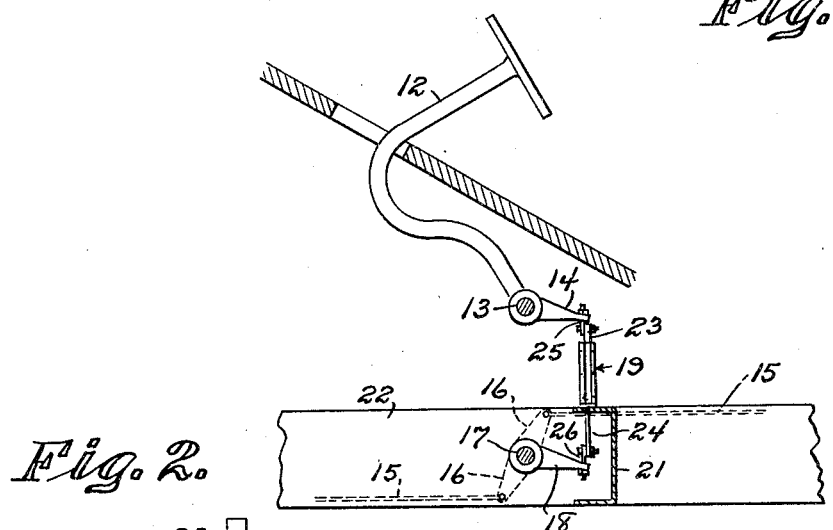
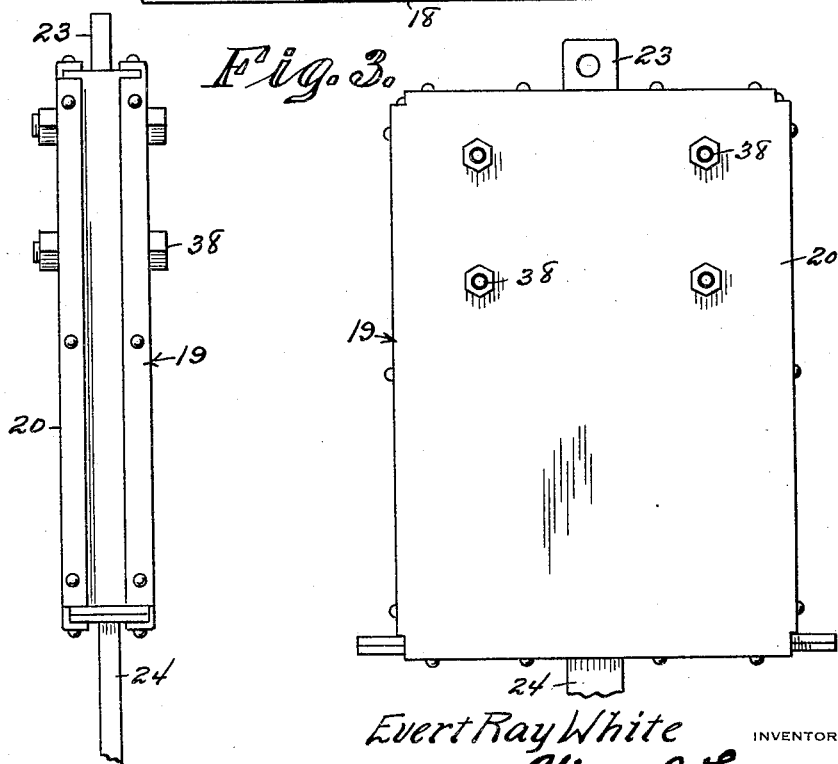

Evert Ray White
INVENTOR

Patented Oct. 22, 1929

1,732,997

UNITED STATES PATENT OFFICE

EVERT R. WHITE, OF SALEM, OREGON

ATTACHMENT FOR AUTOMOBILE BRAKES

Application filed April 20, 1928. Serial No. 271,551.

This invention relates to improvements in brake operating mechanisms, especially adapted for operating the brakes of automobiles, an object being to provide means for taking up lost motion in such mechanisms at the initial depression of the brake pedal and in such manner that only a slight movement of the pedal will be required to apply the brakes. One of the most difficult things in brake adjustment is to obtain a proper release of the brakes from the brake drums with a minimum movement of the brake pedal, and to provide for prompt application of the brakes when the pedal is depressed, and yet leave the brake band free of the drums when the pedal is released. This is especially true of four wheel brakes, where the lost motion in the linkage of the mechanism is double that of two wheel brakes. In the majority of cases, two-thirds of the travel of the brake pedal is wasted in taking up this lost motion, so that by the time the brake bands are in braking contact with the drums, the brake pedal almost reaches the floor board. This requires further adjustment of the brakes within a relatively short time.

To overcome this, the present invention provides for automatically changing the ratio of travel of the brake rods and pedal, so that upon the initial operation of the pedal the ratio of the travel of the rods will be greatest, or greater than that of the pedal, while subsequent to this initial operation, the ratio of travel of the rods and pedal will be the same.

With the above and other objects in view, the invention further includes the following novel features and details of construction, to be hereinafter more fully described, illustrated in the accompanying drawings and pointed out in the appended claims.

In the drawings:—

Figure 1 is a fragmentary sectional view illustrating the invention.

Figure 2 is an enlarged edge view of the invention per se.

Figure 3 is a face view.

Figure 4 is an elevation with the cover of the housing removed and the parts in position prior to the initial operation of the brake pedal.

Figure 5 is a similar view showing the parts in position after the brake has been applied.

Figure 6 is a sectional view on the line 6—6 of Figure 4.

Figure 7 is a similar view on the line 7—7 of Figure 5.

Figure 8 is a section on the line 8—8 of Figure 4.

Figure 9 is a detail perspective view of the pedal connected section of the draw bar.

Figure 10 is a perspective view of one of the links.

Figure 11 is a like view of the other link.

Referring to the drawings in detail wherein like characters of reference denote corresponding parts, the reference character 12 indicates the brake pedal of an automobile which is mounted upon the usual shaft 13, from which extends an arm 14 having connection with brake operating rods 15. These rods are shown by dotted lines in Figure 1 and extend in opposite directions for operating the brakes of the front and rear wheels of an automobile. The rods 15 are connected to arms 16, also shown by dotted lines and these arms are fast upon a rock shaft 17 from which extends an arm 18. This arm is connected to the arm 14 by a compensating mechanism which is indicated generally at 19 and which forms the subject matter of the present invention.

The mechanism 19 is contained within a housing 20 and the latter is suitably mounted upon the frame of the automobile. For example, the housing 20 may be mounted upon a cross bar 21 which is connected to the side bars 22 of the automobile frame.

Mounted for sliding movement within the housing 20 is a draw bar which includes a section 23 and a section 24. The section 23 of the draw bar extends through the top of the casing and has suitable connection indicated at 25 with the arm 14. The section 24 extends through the opposite end of the casing and this section has a connection 26 with the arm 18. The sections 23 and 24 are connected for relative sliding movement and for this purpose, one of the sections carries a stud 27 which operates within slots 28 provided in spaced plates 29 which form the inner end of the other section and which straddle the stud carrying section, the latter in the present instance being the section 23. The section 23 is provided with laterally extending arms 30 whose opposite ends slidingly engage guide blocks 31 secured within the casing. These arms in addition to providing a sliding engagement with the guide blocks 31, also have pivotally connected thereto as shown at 32, the bifurcated ends of links 33 and 34. The link 33 is shown in detail in Figure 10 and the link 34 in Figure 11 of the drawings. Mounted within the bifurcated ends of the links 33 and 34 are rollers 35, and these rollers engage the guides 31, the purpose of which will be later explained. The links 33 and 34 are substantially L-shaped and their free arms 36 engage rollers 37 provided upon opposite sides of the section 24 of the draw bar.

Normally, the parts are arranged in the position shown in Figures 4 and 6 of the drawings. Upon the initial downward movement of the brake pedal 12, the draw bar will be given a slight upward movement. This movement will be sufficient to cause the rollers 35 to ride upon the guide blocks 31 so as to move the free ends of the arms 36 of the links 33 and 34 relatively inward and engage the rollers 37 upon opposite sides of the section 24 of the draw bar.

Inward movement of the arms 36 will cause the section 24 of the draw bar to travel upward at a greater speed than the speed of travel of the section 23 of said bar. This increased speed of travel of the section 24 of the draw bar will continue until the limit of inward movement of the links 33 and 34 has been reached and the stud 27 occupies a position at the lower end of the slot 28. The ratio of movement of the section 23 and the section 24 of the draw bar is substantially three to one, the section 24 travelling approximately three times as fast as the section 23. As soon as the limit of inward movement of the links 33 and 34 is reached, the section 23 and the section 24 of the draw bar will be locked against relative movement so that these sections will then travel as a unit and their speed of travel will be uniform.

The housing is held assembled by means of bolts 38 which also serve to secure the guide blocks 31 in place.

The invention is susceptible of various changes in its form, proportions and minor details of construction and the right is herein reserved to make such changes as properly fall within the scope of the appended claims.

Having described the invention what is claimed is:—

1. In a brake operating mechanism, a brake pedal, a brake operating rod, means operatively connecting the pedal and rod whereby operation of the pedal will move the rod to actuate the brake, said means including a sectional draw bar having its sections arranged in alignment, with one section operatively connected with the pedal and its other section operatively connected with the rod, means connecting the sections to one another to permit of relative independent movement, and means carried by one section of the bar and operatively engageable with the other section to provide a greater speed of travel of the rod connected section over the speed of travel of the pedal connected section at the initial operation of said pedal, to lock said sections against independent movement after such initial operation.

2. In a brake operating mechanism, a brake pedal, a brake operating rod, means operatively connecting the pedal and rod whereby operation of the pedal will move the rod to actuate the brake, said means including a sectional draw bar having one section operatively connected with the pedal and its other section operatively connected with the rod, means slidingly connecting the sections to one another to permit of relative independent movement, and means pivotally connected to one section of the bar and engageable with the other section to provide a difference in ratio of travel of the sections when the brake pedal is operated.

3. In a brake operating mechanism, a brake pedal, a brake operating rod, means operatively connecting the pedal and rod whereby operation of the pedal will move the rod to actuate the brake, said means including a sectional draw bar having one section operatively connected with the pedal and its other section operatively connected with the rod, means connecting the sections to permit of relative independent movement, a pair of L-shaped members having one of their ends pivotally secured to one section of the bar, means carried by the other section of said bar for engagement by the L-shaped members, and means controlled by the movement of the brake pedal sections to force said members into such engagement.

4. In a brake operating mechanism, a brake pedal, a brake operating rod, means operatively connecting the pedal and rod whereby operation of the pedal will move the rod to actuate the brake, said means including a sectional draw bar having one section operatively connected with the pedal and its other section operatively connected with the rod, means connecting the sections to permit of relative independent movement, a pair of L-shaped members having one of their ends pivotally secured to one section of the bar, means carried by the other section of said bar for engagement by the L-shaped members, and means controlled by the movement of the brake pedal sections to force said members into such engagement and to guide the pedal connected section.

In testimony whereof I affix my signature.

EVERT R. WHITE.